(12) United States Patent
Ding et al.

(10) Patent No.: US 8,712,412 B2
(45) Date of Patent: Apr. 29, 2014

(54) METHOD AND SYSTEM FOR ACCOMPLISHING USER EQUIPMENT PURGE

(75) Inventors: Zhaoming Ding, Shenzhen (CN); Zhendong Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 113 days.

(21) Appl. No.: 13/258,395

(22) PCT Filed: Feb. 11, 2010

(86) PCT No.: PCT/CN2010/070660
§ 371 (c)(1),
(2), (4) Date: Apr. 25, 2012

(87) PCT Pub. No.: WO2010/145218
PCT Pub. Date: Dec. 23, 2010

(65) Prior Publication Data
US 2012/0220296 A1    Aug. 30, 2012

(30) Foreign Application Priority Data
Oct. 30, 2009    (CN) .......................... 2009 1 0209419

(51) Int. Cl.
*H04W 4/00* (2009.01)
(52) U.S. Cl.
USPC ...................................... 455/435.1; 455/433
(58) Field of Classification Search
None
See application file for complete search history.

(56) References Cited

U.S. PATENT DOCUMENTS

2008/0076386 A1    3/2008 Khetawat et al.

FOREIGN PATENT DOCUMENTS

| CN | 101072111 A | 11/2007 |
|---|---|---|
| CN | 101247638 A | 8/2008 |
| CN | 101500290 A | 8/2009 |
| CN | 101568178 A | 10/2009 |
| JP | 2002320255 A | 10/2002 |
| JP | 2003511938 A | 3/2003 |
| JP | 2005303847 A | 10/2005 |
| WO | 2008036961 A2 | 3/2008 |
| WO | 2009129893 A1 | 10/2009 |

OTHER PUBLICATIONS

International Search Report in international application No. PCT/CN2010/070660, mailed on Aug. 12, 2010.
English Translation of the Written Opinion of the International Search Authority in international application No. PCT/CN2010/070660, mailed on Aug. 12, 2010.
Huawei, 3GPP TSG SA WG2 Meeting #69, S2-087545—Discussion about the detach procedure in CS Fallback and ISR scenario, US, Nov. 21, 2008, 3 pages.

*Primary Examiner* — Erika A Washington
(74) *Attorney, Agent, or Firm* — Oppedahl Patent Law Firm LLC

(57) ABSTRACT

The present disclosure relates a method and system for accomplishing a UE purge. The method comprises: a combined node initiates a purge flow of the UE to a HSS to which the UE is attached when determining that a registration state of the UE in all mobility management network elements of the combined node is unregistered and the registration state is not consistent with a registration state of the UE stored in the HSS; wherein the combined node comprises one or more mobility management network elements. The method and system for accomplishing user equipment purge provided by the present disclosure are simple and convenient to implement and effectively solve the technical problem in the prior art.

30 Claims, 12 Drawing Sheets

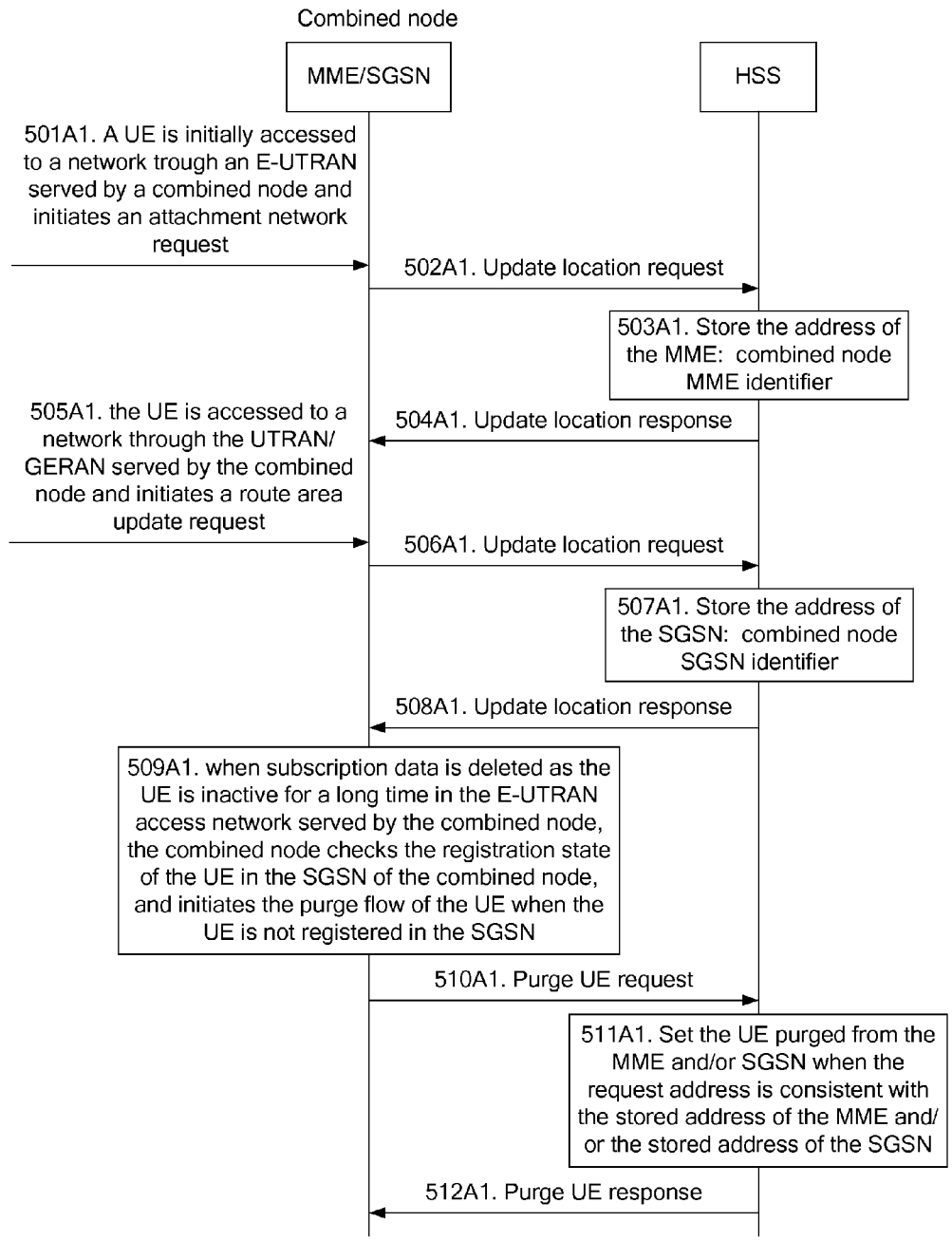

Fig. 5A2
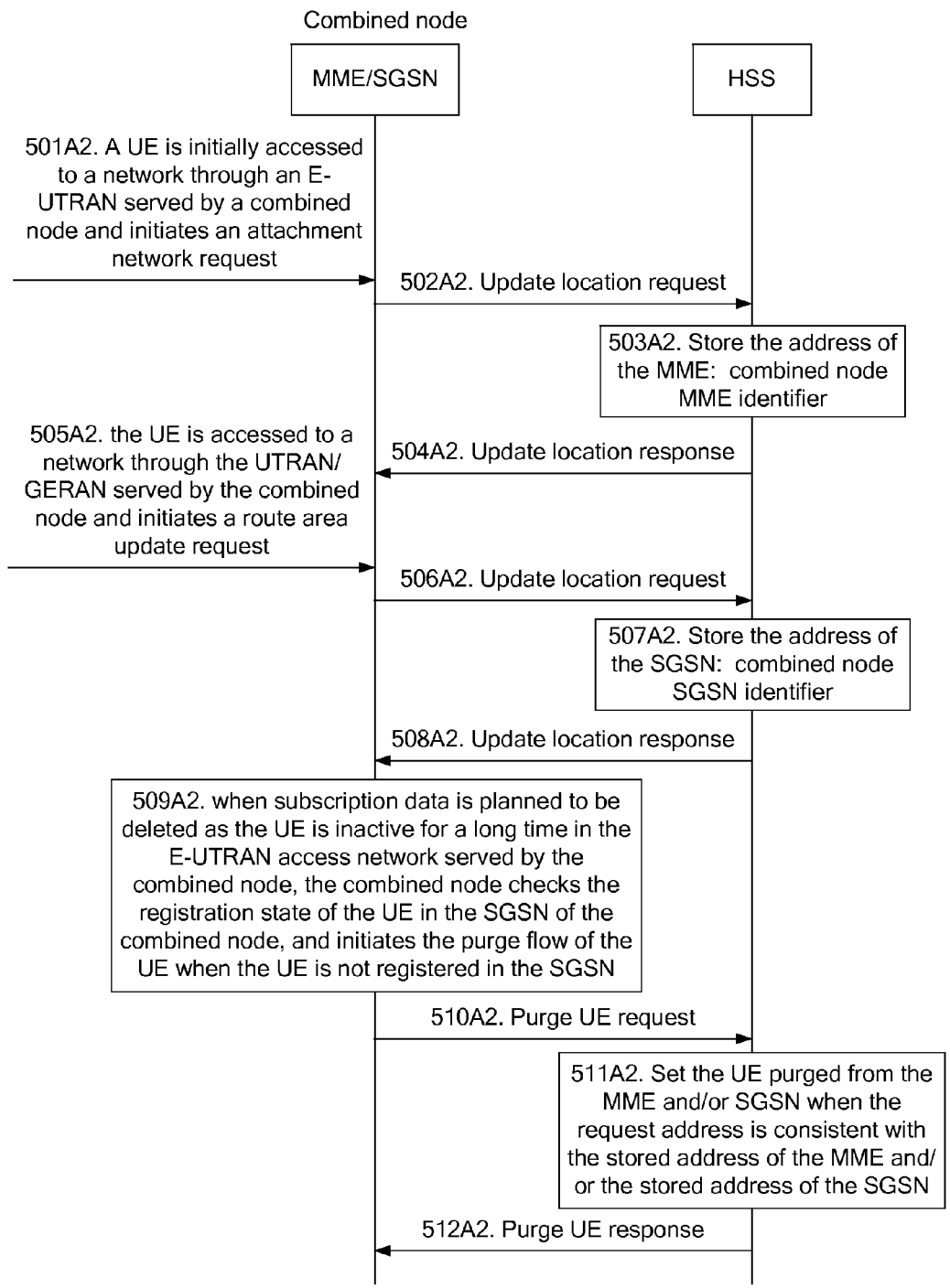

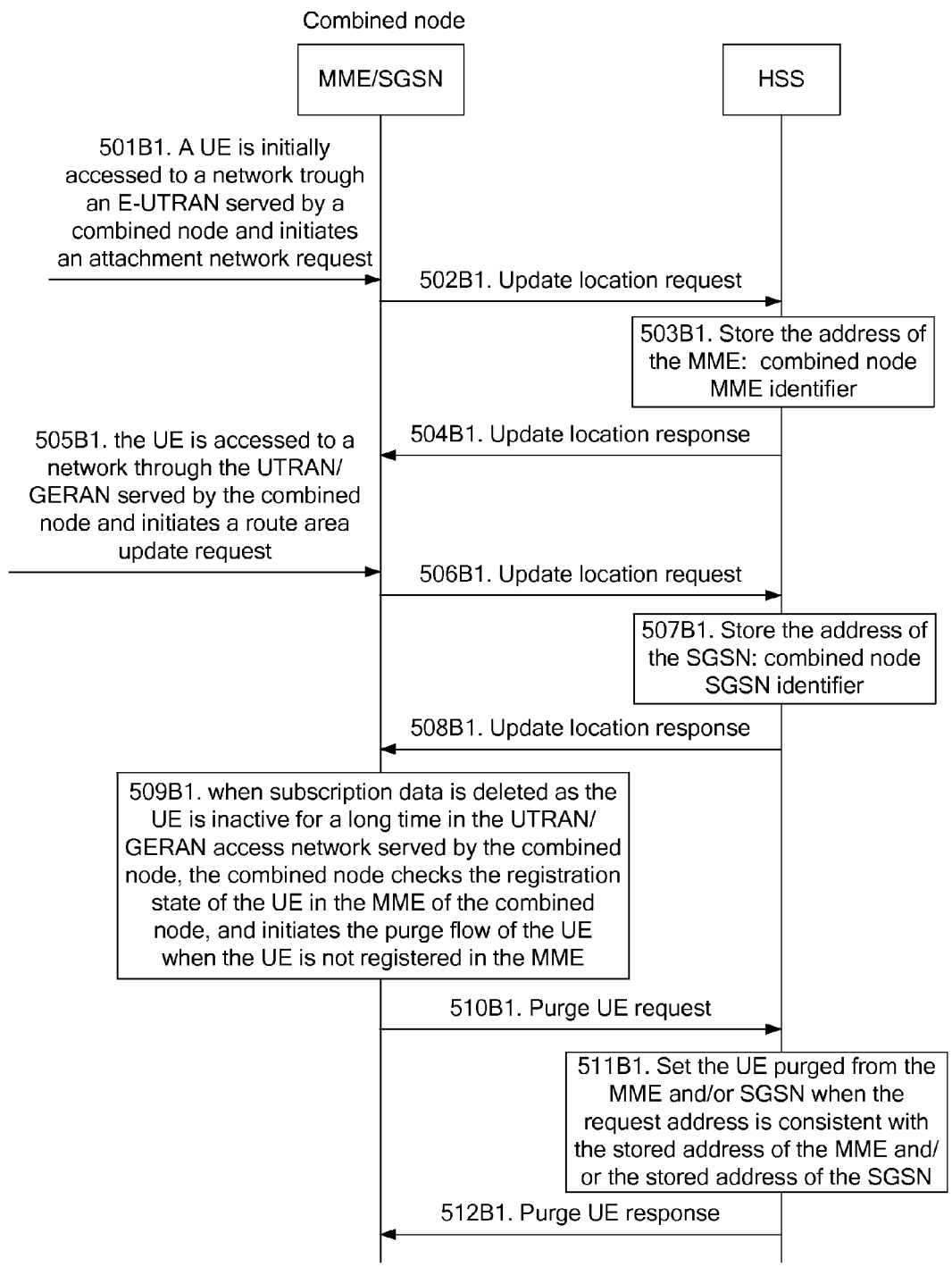

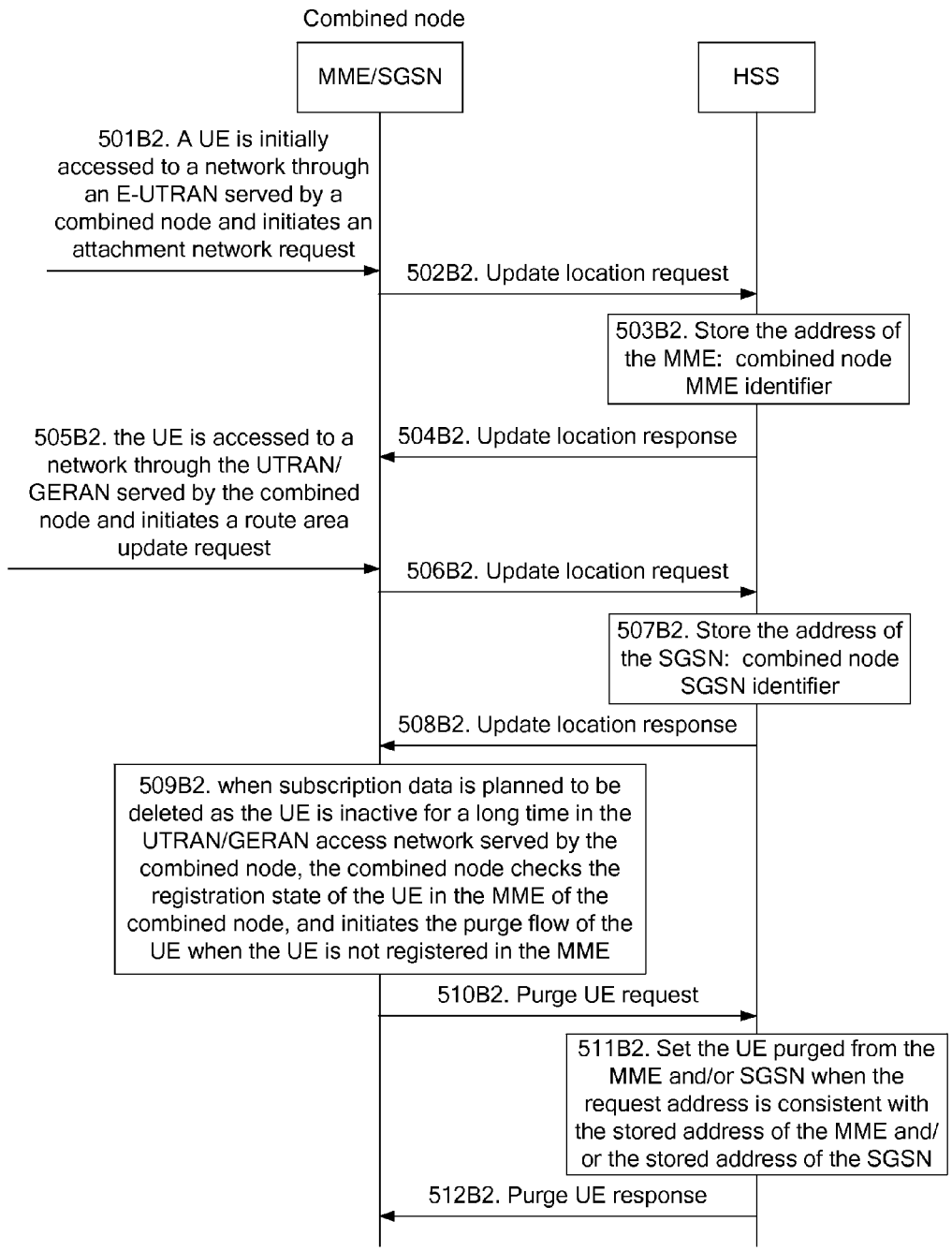

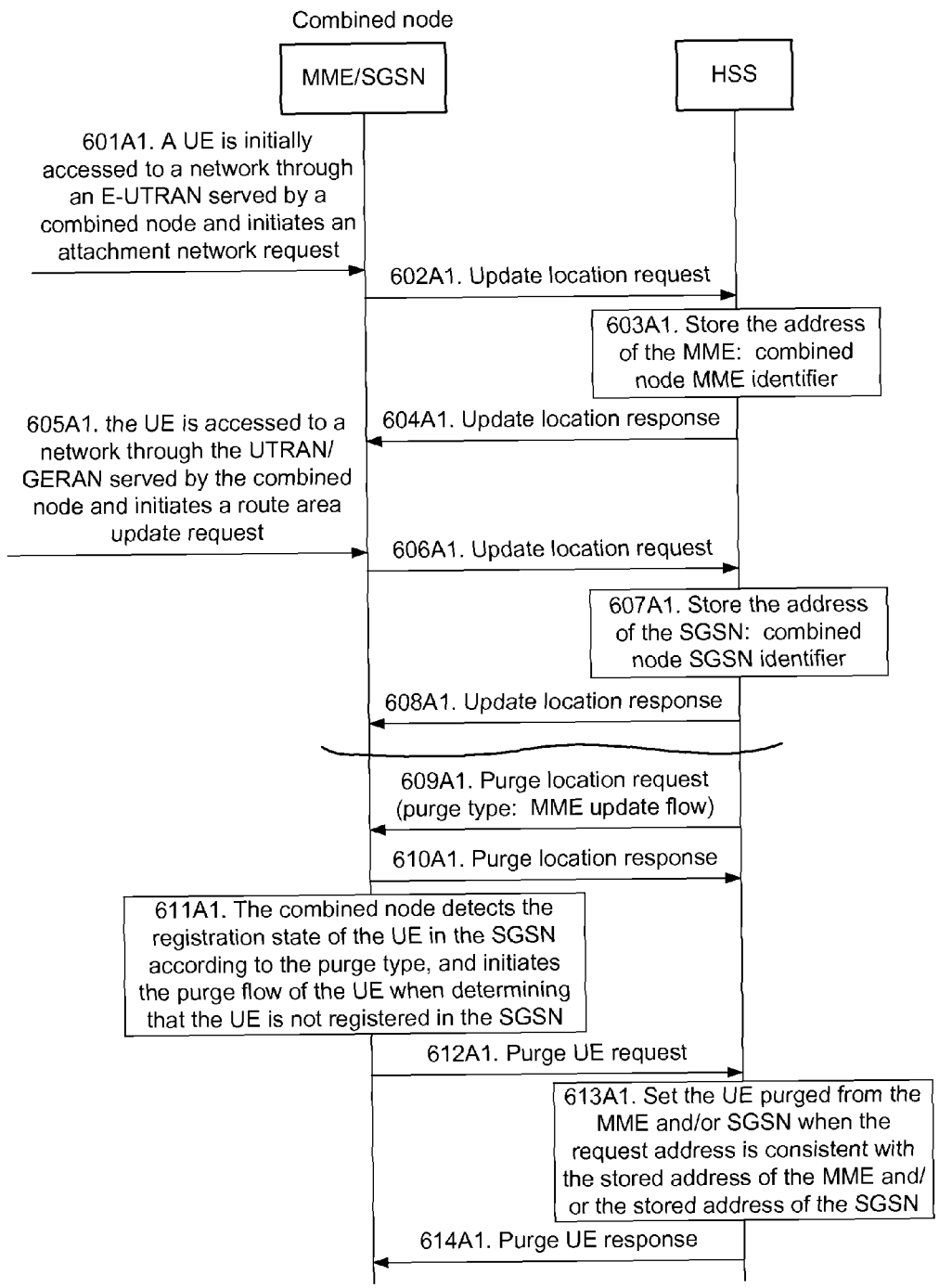
Fig. 6A1

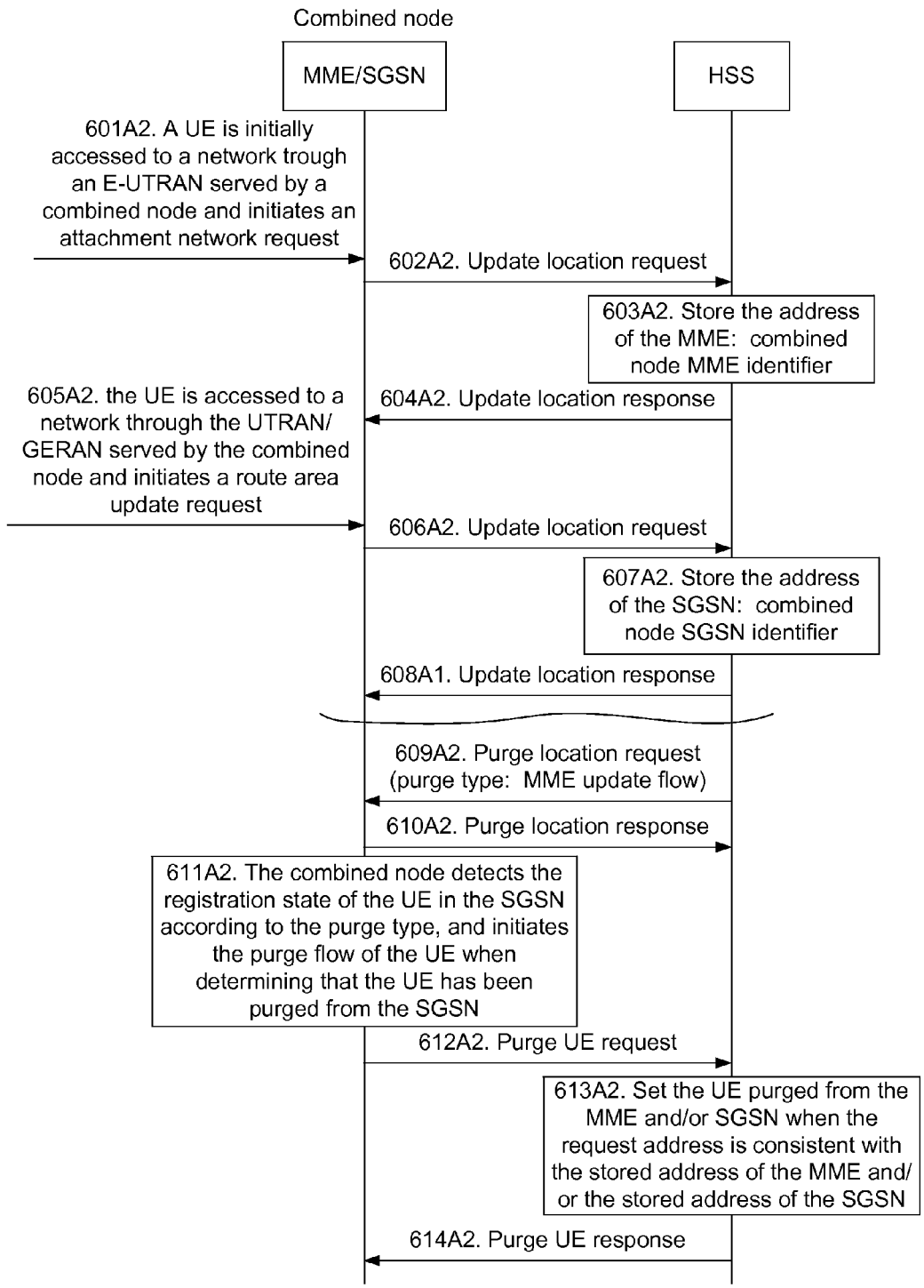
Fig. 6A2

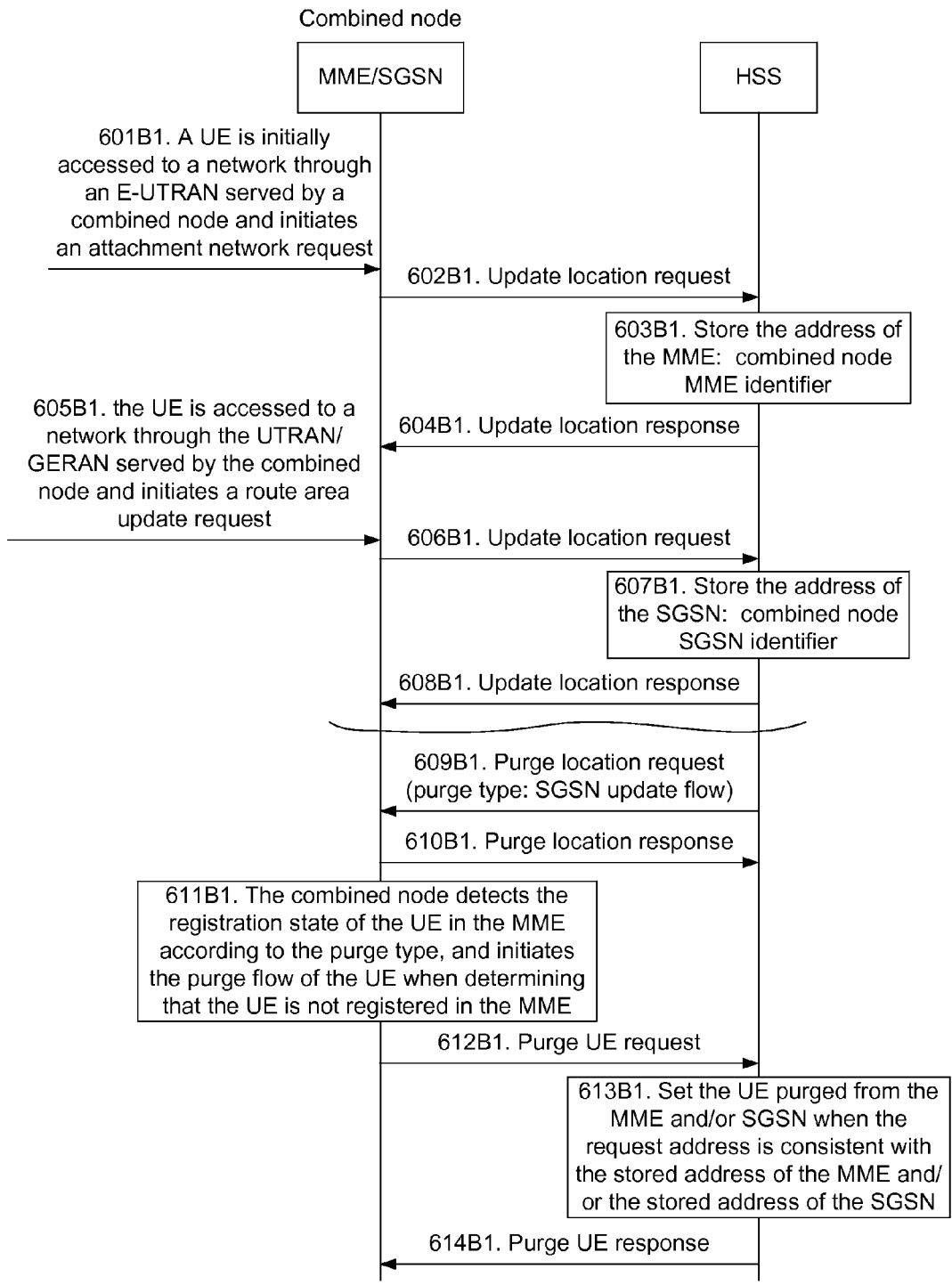
Fig. 6B1

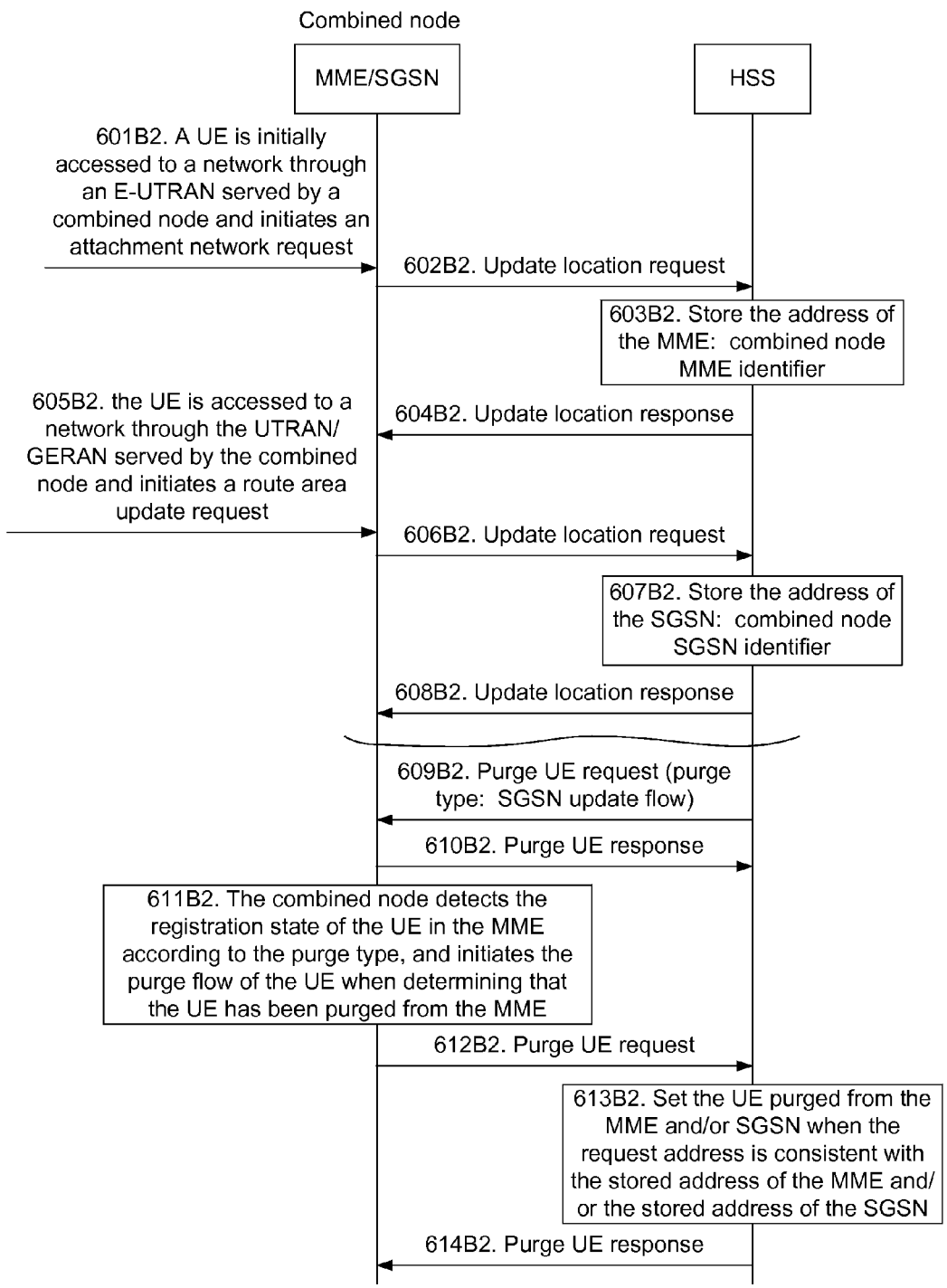
Fig. 6B2

METHOD AND SYSTEM FOR ACCOMPLISHING USER EQUIPMENT PURGE

TECHNICAL FIELD

The present disclosure relates to the field of communications, particularly to a method and system for accomplishing user equipment purge.

BACKGROUND

With the constant emergence of new technologies, the $3^{rd}$ Generation Partnership Project (3GPP) needs to consider the continuous evolution and enhancement from a radio interface to a core network in the system architecture evolution in the future mobile communication field, so as to keep its first-mover technical advantage in the mobile communication field within the next 10 years and provide a satisfactory support for the growing demands of operators and users. Therefore, the evolution project EPS (Evolved Packet System) for an all-IP packet switched core network is initiated against such background. The EPS aims to "formulate a portable 3GPP system architecture structure characterized by high data rate, low delay, data packetization and supporting multiple radio access technologies".

The EPS network is characterized by supporting end-to-end Quality of Service (QoS) assurance, comprehensive packetization, supporting multiple access technologies and real-time services, network layer flattening and the like. FIG. 1 shows a reference architecture of the EPS network; as shown in the FIG. 1, the EPS network further realizes the data separation between a control panel and a user panel, and additionally provides a network element MME (Mobility Management Entity) which serves as a network functional entity for bearing user data of a control panel, and has the functions of supporting roaming, authentication, bearing management and the like. The S6a interface between an MME and a Home Subscriber Server (HSS) provides the download of user data and authentication data, and the like. A UE is accessed to the EPS network through an Evolved Universal Terrestrial Radio Access Network (E-UTRAN), and implements the network registration in the HSS through the MME and acquires the address of a serving gateway and the address of a Packet Data Network (PDN) gateway, so as to be accessed to an operator Internet Protocol (IP) service network through the PDN gateway. The policy control of the EPS network is downloaded to the PDN gateway through a policy control rule function, and related QoS control is performed by the PDN gateway.

The EPS network supports the UE to be accessed thereto through a Serving GPRS Support Node (SGSN, which is a network element in charge of the mobility management at a core network side) by means of a traditional accessing way, such as a Universal Terrestrial RADIO Access Network (UTRAN) or a GSM EDGE Radio Access Network (GERAN), and defines the S6d interface between the SGSN and the HSS, wherein the S6d interface has the same basic function as the S6a interface, is used for downloading the EPS subscription data and GPRS subscription data, and implements the network registration of a user through the SGSN.

The HSS supports that the UE can be registered in a core network through the MME or SGSN, and the HSS stores the addresses of the registered MME and SGSN. The MME or SGSN deletes the stored subscription information of the UE and initiates to the HSS a purge flow of the UE when detecting that the UE is inactive for a long time in the access network served by the MME or SGSN. FIG. 2 shows a register and purge flow of a UE through different access networks in the prior art, in which it is assumed that the registered network nodes MME and SGSN are deployed independently, the flow includes the following steps:

S201~S204: a UE is initially accessed to an EPS network through E-UTRAN, MME initiates to the HSS an update location flow, and the HSS stores the address of the MME where the UE has been registered;

S205~S208: the UE is switched and accessed to the EPS network through UTRNA/GERAN, the SGSN initiates to the HSS an update location flow, and the HSS stores the address of the SGSN where the UE has been registered;

S209~S211: the MME initiates to the HSS a purge flow of the UE when detecting that the UE is inactive for a long time in the E-UTRAN access network served by the MME, the HSS determines whether the source address in a request message is matched with one of all the registered network addresses, and makes the UE purged from the MME and performs related purge operation of the UE when finding that the source address is matched with the address of the MME; and S212~S214: the SGSN initiates to the HSS a purge flow of the UE when detecting that the UE is inactive for a long time in the UTRAN/GERAN access network served by the SGSN, the HSS determines whether the source address in the request message is matched with one of all the registered network addresses, and makes the UE purged from the SGSN and performs related purge operation of the UE when finding that the source address is matched with the address of the SGSN.

Furthermore, when deploying a network, an operator may integratively deploy the MME and SGSN and use the same network node or different network nodes. FIG. 3 shows a register and purge flow of a UE through different access networks in the prior art, in which it is assumed that the registered network nodes MME and SGSN are integratively deployed and have the different address in the combined node, the flow includes the following steps:

S301~S304: a UE is initially accessed to an EPS network through an E-UTRAN, the combined node initiates an update location flow to the HSS through the S6a interface, wherein the source address is the address of MME in the combined node, and the HSS stores the address of MME in the combined node where the UE has been registered;

S306~S308: the UE is switched and accessed to the EPS network through UTRAN/GERAN, the combined node initiates an update location flow to the HSS through the S6d interface, wherein the source address is the address of SGSN in the combined node, and the HSS stores the address of SGSN in the combined node where the UE has been registered; and S309~S311: the combined node initiates to the HSS a purge flow of the UE through the S6a interface when detecting that the UE is inactive for a long time in the E-UTRAN access network served by the combined node, the HSS determines whether the source address in the request message is matched with one of all the registered network addresses, and makes the UE purged from the MME and performs related purge operation of the UE when finding that the source address is matched with the address of the MME.

FIG. 4 shows a register and purge flow of a UE through different access networks in the prior art, in which it is assumed the registered network nodes MME and SGSN are integratively deployed and have the same address in the combined node, the flow includes the following steps:

S401~S404: UE is initially accessed to an EPS network through an E-UTRAN, the combined node initiates an update location flow to the HSS through the S6a interface, wherein the source address is the address of MME in the combined node, and the HSS stores the address of MME in the combined node where the UE has been registered;

S406~S408: the UE is switched and accessed to the EPS network through UTRAN/GERAN, the combined node initiates an update location flow to the HSS through the S6d interface, wherein the source address is the address of SGSN in the combined node, and the HSS stores the address of SGSN in the combined node where the UE has been registered; and S409~S411: the combined node initiates to the HSS a purge flow of the UE through the S6a interface when detecting that the UE is inactive for a long time in the E-UTRAN access network served by the combined node, the HSS determines whether the source address in the request message is matched with one of all the registered network addresses, since the MME and SGSN in the registered combined nodes have the same address, the source address is matched with both the address of MME and that of SGSN, therefore the HSS makes the UE purged from both the MME and the SGSN and performs related purge operation of the UE.

It can be seen from the abovementioned flow, when receiving a purge UE request from a network node, the HSS will determines whether the source address in the request message is matched with one of all the registered network addresses, and makes the UE purged from a certain network entity, such as the MME or the SGSN, when the source address is matched with the address of the certain network entity. Such matching way does not cause mutual interference when the MME node and the SGSN node have different addresses, i.e., the purge flow of the UE in the MME node does not affect the registration state of the UE in the SGSN node stored by the HSS, or the purge flow of the UE in the SGSN node does not affect the registration state of the UE in the MME node stored by the HSS. However, when the MME node and the SGSN node are integratively deployed and have the same address, such matching way will cause the registration state of the UE in the MME node and the registration state of the UE in the SGSN node, which are stored by the HSS, to be purged during the purge flow of the UE initiated by a combined node.

Obviously, such processing way is improper; in the application scenario of the FIG. 4, the purge flow of the UE initiated by the combined node may cause the problem that the registration state of the UE in the MME or SGSN is registered but the HSS wrongly sets the UE purged.

SUMMARY

The technical problem to be solved by the present disclosure is to provide a method and system for accomplishing user equipment purge, so as to solve the problem caused by the purge flow of the UE that the registration state of the UE in an MME or an SGSN is registered, but an HSS wrongly sets the UE purged.

In order to solve the technical problem, the present disclosure provides a method for accomplishing user equipment purge, including:

a combined node initiates a purge flow of the UE to an HSS to which the UE is attached when the combined node determines that a registration state of the UE in all mobility management network elements of the combined node is unregistered and the registration state is not consistent with a registration state of the UE stored in the HSS;

wherein the combined node comprises one or more mobility management network elements.

The method may further have the following feature:
the registration state of the UE in all mobility management network elements of the combined node being unregistered indicates that subscription data of the UE in each mobility management network element of the combined node is not existed or has been deleted, or each mobility management network element of the combined node has set a purge mark of the UE therein.

The method may further have the following feature:
the registration state of the UE stored in the HSS indicates that the HSS has set the purge mark of the UE in the mobility management network element, or indicates that the HSS clears the purge mark of the UE in the mobility management network element and stores addresses of all the mobility management network elements of the combined node where the UE is registered.

The method may further have the following feature:
the combined node includes two mobility management network elements;
wherein a first mobility management network element is a Mobility Management Entity (MME), and a second mobility management network element is a Serving GPRS Support Node (SGSN); or the first mobility management network element is an SGSN, and the second mobility management network element is an MME; and
the first mobility management network element and the second mobility management network element have the same address.

The method may further have the following feature:
the combined node checks the registration state of the UE in the second mobility management network element when actively deleting the subscription data of the UE in the first mobility management network element; in the case that the registration state of the UE in the second mobility management network element is unregistered, the combined node determines that the registration state of the UE in all mobility management network elements is unregistered and is not consistent with the registration state stored in the HSS, then initiates the purge flow of the UE to the HSS.

The method may further have the following feature:
in the step that the combined node checks the registration state of the UE in the second mobility management network element,
in the case that the registration state of the UE in the second mobility management network element is unregistered, the combined node clears the purge mark of the UE in the second mobility management network element; and
in the case that the registration state of the UE in the second mobility management network element is registered, the combined node sets the purge mark of the UE in the first mobility management network element.

The method may further have the following feature:
the combined node receives a location purge message from the HSS,
when a location purge type in the location purge message is an update flow of the first mobility management network element, the combined node clears the purge mark of the UE in the first mobility management network element, and checks the registration state of the UE in the second mobility management network element; when the registration state of the UE in the second mobility management network element is unregistered, the combined node determines that the registration state of the UE in all mobility management network elements is unregistered and is not consistent with the registration state stored in the HSS, and initiates the purge flow of the UE to the HSS; and when the location purge type in the location purge message is an update flow of the second mobility management network element, the combined node clears the purge mark of the UE in the second mobility management network element, and checks the registration state of the UE in the first mobility management network element; when the registration state of the UE in the first mobility management network element is unregistered, the combined node determines that the registration state of the UE in all mobility management network elements is unregistered and is not consistent with the registration state stored in the HSS, and initiates the purge flow of the UE to the HSS.

The present disclosure further provides a system for accomplishing a user equipment (UE) purge, including an HSS and a combined node which comprises one or more mobility management network elements, wherein the combined node is configured to initiate a purge flow of the UE to the HSS when determining that a registration state of the UE in all mobility management network elements is unregistered and the registration state is not consistent with a registration state stored in the HSS.

The system may further have the following feature:
the registration state of the UE in all mobility management network elements of the combined node being unregistered indicates that subscription data of the UE in each mobility management network element of the combined node is not existed or has been deleted, or each mobility management network element of the combined node has set a purge mark of the UE therein.

the system may further have the following feature:
the registration state of the UE stored in the HSS indicates that the HSS has set the purge mark of the UE in the mobility management network element, or indicates that the HSS clears the purge mark of the UE in the mobility management network element and stores addresses of all the mobility management network elements of the combined node where the UE is registered.

The system may further have the following feature:
the combined node includes two mobility management network elements;
wherein a first mobility management network element is a Mobility Management Entity (MME), and a second mobility management network element is a Serving GPRS Support Node (SGSN); or the first mobility management network element is an SGSN, and the second mobility management network element is an MME; and
the first mobility management network element and the second mobility management network element have the same address.

The system may further have the following feature:
the combined node is further configured to check the registration state of the UE in the second mobility management network element when actively deleting subscription data of the UE in the first mobility management network element; in the case that the registration state of the UE in the second mobility management network element is unregistered, determine that the registration state of the UE in all mobility management network elements is unregistered and is not consistent with the registration state stored in the HSS, and initiate the purge flow of the UE to the HSS.

The system may further have the following feature:
the combined node is further configured to clear the purge mark of the UE in the second mobility management network element when determining that the registration state of the UE in the second mobility management network element is unregistered; or set the purge mark of the UE in the first mobility management network element when determining that the registration state of the UE in the second mobility management network element is registered.

The system may further have the following feature:
the combined node is further configured to, after receiving a location purge message from the HSS, clear the purge mark of the UE in the first mobility management network element and check the registration state of the UE in the second mobility management network element when a location purge type in the location purge message is an update flow of the first mobility management network element; when the registration state of the UE in the second mobility management network element is unregistered, determine that the registration state of the UE in all mobility management network elements is unregistered and is not consistent with the registration state stored in the HSS, and initiate the purge flow of the UE to the HSS; and clear the purge mark of the UE in the second mobility management network element and check the registration state of the UE in the first mobility management network element when the location purge type in the location purge message is an update flow of the second mobility management network element; when the registration state of the UE in the first mobility management network element is unregistered, determine that the registration state of the UE in all mobility management network elements is unregistered and is not consistent with the registration state stored in the HSS, and initiate the purge flow of the UE to the HSS.

The method and system for accomplishing user terminal purge provided by the present disclosure are simple and convenient to implement and effectively solve the technical problem in the prior art.

BRIEF DESCRIPTION OF THE DRAWINGS

FIG. 5A1 is a diagram showing a purge flow of UE performed by a combined node when the UE is inactive for a long time in the E-UTRAN served by the combined node in the application scenario of FIG. 4 according to an embodiment of the present disclosure, wherein the subscription data in the MME and the subscription data in SGSN are stored separately;

FIG. 5A2 is another diagram showing a purge flow of UE performed by a combined node when the UE is inactive for a long time in the E-UTRAN served by the combined node in the application scenario of FIG. 4 according to an embodiment of the present disclosure, wherein the subscription data in the MME and the subscription data in SGSN are stored separately;

FIG. 5B1 is a diagram showing a purge flow of UE performed by a combined node when the UE is inactive for a long time in the UTRAN/GERAN served by the combined node in the application scenario of FIG. 4 according to an embodiment of the present disclosure, wherein the subscription data in the MME and the subscription data in SGSN are stored separately;

FIG. 5B2 is another diagram showing a purge flow of UE performed by a combined node when the UE is inactive for a long time in the UTRAN/GERAN served by the combined node in the application scenario of FIG. 4 according to an embodiment of the present disclosure, wherein the subscription data in the MME and the subscription data in SGSN are stored separately or integratively;

FIG. 6A1 is a diagram showing a purge flow of UE performed by a combined node when a purge type in a location purge message received by the combined node is an update flow of the MME in the application scenario of FIG. 4 according to an embodiment of the present disclosure, wherein the subscription data in the MME and the subscription data in the SGSN are stored separately;

FIG. 6A2 is another diagram showing a purge flow of UE performed by a combined node when a purge type in a location purge message received by the combined node is an update flow of the MME in the application scenario of FIG. 4 according to an embodiment of the present disclosure, wherein the subscription data in the MME and the subscription data in the SGSN are stored separately or integratively;

FIG. 6B1 is a diagram showing a purge flow of UE performed by a combined node when a purge type in a location purge message received by the combined node is an update flow of the SGSN in the application scenario of FIG. 4 according to an embodiment of the present disclosure, wherein the subscription data in the MME and the subscription data in the SGSN are stored separately; and FIG. 6B2 is another diagram showing a purge flow of UE performed by a combined node when a purge type in a location purge message received by the combined node is an update flow of the SGSN in the application scenario of FIG. 4 according to an embodiment of the present disclosure, wherein the subscription data in the MME and the subscription data in the SGSN are stored separately or integratively.

DETAILED DESCRIPTION

Figure 1:
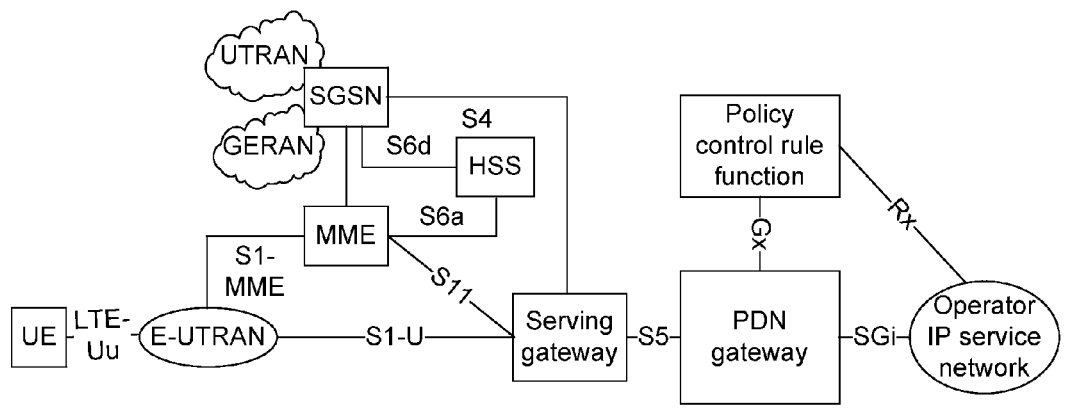
FIG. 1 is a reference schematic diagram showing an architecture of packet data switched network evolution in the prior art.

The basic idea of the present disclosure is: a combined node initiates a purge flow of a UE to the HSS when determining that the registration state of a UE in all mobility management network elements of the combined node is unregistered and is not consistent with the registration state stored in an HSS.

The combined node includes one or more mobility management network elements.

The present disclosure is described in detail below with reference to the drawings and specific embodiments.

In an embodiment, the combined node includes two mobility management network elements, i.e., a first mobility management network element and a second mobility management network element;

wherein the first mobility management network element is a Mobility Management Entity (MME), and the second mobility management network element is a Serving GPRS Support Node (SGSN); or the first mobility management network element is an SGSN, and the second mobility management network element is an MME; and the first mobility management network element and the second mobility management network element have the same address, i.e., the MME and the SGSN of the combined node have the same address.

In this embodiment, the combined node initiates the purge flow of the UE to the HSS under the two following conditions: the combined node actively deletes the subscription data of the UE in the mobility management network element (always when the combined node detects that the UE is inactive for a long time in a certain access network served by the combined node); or the combined node receives a location purge message from the HSS.

1. Under the Condition that the Combined Node Actively Deletes the Subscription Data of the UE in the Mobility Management Network Element:

(1) for example, when actively deleting the subscription data of the UE in the first mobility management network element, the combined node checks the registration state of the UE in the second mobility management network element, when the registration state of the UE in the second mobility management network element is unregistered, i.e., the subscription data of the UE in the second mobility management network element is not existed or has been deleted, or the purge mark of the UE in the second mobility management network element has been set, the combined node determines that the registration state of the UE in all mobility management network elements of the combined node is unregistered and is not consistent with the registration state stored in the HSS, therefore initiates the purge flow of the UE to the HSS; when the registration state of the UE in the second mobility management network element is registered, i.e., the subscription data of the UE in the second mobility management network element is existed, or the purge mark of the UE in the second mobility management network element is not set and in a "clear" state, the combined node does not initiate the purge flow of the UE.

When the combined node checks the registration state of the UE in the second mobility management network element, the combined node clears the purge mark of the UE in the second mobility management network element in the case that the registration state of the UE in the second mobility management network element is unregistered; and the combined node sets the purge mark of the UE in the first mobility management network element in the case that the registration state of the UE in the second mobility management network element is registered.

(2) for example, when actively deleting the subscription data of the UE in the second mobility management network element, the combined node checks the registration state of the UE in the first mobility management network element, when the registration state of the UE in the first mobility management network element is unregistered, i.e., the subscription data of the UE in the first mobility management network element is not existed or has been deleted, or the purge mark of the UE in the first mobility management network element has been set, the combined node determines that the registration state of the UE in all mobility management network elements of the combined node is unregistered and is not consistent with the registration state stored in the HSS, therefore initiates the purge flow of the UE to the HSS; when the registration state of the UE in the first mobility management network element is registered, i.e., the subscription data of the UE in the first mobility management network element is existed, or the purge mark of the UE in the first mobility management network element is not set and in a "clear" state, the combined node does not initiate the purge flow of the UE.

When the combined node checks the registration state of the UE in the first mobility management network element, the combined node clears the purge mark of the UE in the first mobility management network element in the case that the registration state of the UE in the first mobility management network element is unregistered; and the combined node sets the purge mark of the UE in the second mobility management network element in the case that the registration state of the UE in the first mobility management network element is registered.

2. Under the Condition that the Combined Node Receives a Location Purge Message from the HSS:

(1) when the location purge type in the location purge message is the update flow of the first mobility management network element, the combined node clears the purge mark of the UE in the first mobility management network element and checks the registration state of the UE in the second mobility management network element. When the registration state of the UE in the second mobility management network element is unregistered, i.e., the subscription data of the UE in the second mobility management network element is not existed or has been deleted, or the purge mark of the UE in the second mobility management network element has been set, the combined node determines that the registration state of the UE in all mobility management network elements of the combined node is unregistered and is not consistent with the registration state stored in the HSS, and initiates the purge flow of the UE to the HSS; when the registration state of the UE in the second mobility management network element is registered, i.e., the subscription data of the UE in the second mobility management network element is existed, or the purge mark of the UE in the first mobility management network element is not set and in a "clear" state, the combined node does not initiate the purge flow of the UE;

(2) when the location purge type in the location purge message is the update flow of the second mobility management network element, the combined node clears the purge mark of the UE in the second mobility management network element and checks the registration state of the UE in the first mobility management network element. When the registration state of the UE in the first mobility management network element is unregistered, i.e., the subscription data of the UE in the first mobility management network element is not existed or has been deleted, or the purge mark of the UE in the first mobility management network element has been set, the combined node determines that the registration state of the UE in all mobility management network elements of the combined node is unregistered and is not consistent with the registration state stored in the HSS, and initiates the purge flow of the UE to the HSS; when the registration state of the UE in the first mobility management network element is registered, i.e., the subscription data of the UE in the first mobility management network element is existed, or the purge mark of the UE in the first mobility management network element is not set and in a "clear" state, the combined node does not initiate the purge flow of the UE.

It should be noted that, in the present disclosure, the clearing of the purge mark of the UE in a certain mobility management network element does not indicate that the purge mark of the UE in the mobility management network element must have been set before operation, i.e., before clearing, the state of the mark may be set or not set, here, the "clear" indicates that the mark is in the state of "not set". Of course, the following way may also be adopted: determining the state of the mark at first, and then clearing the mark when the state of the mark is set.

The system for accomplishing user equipment purge according to an embodiment of the present disclosure includes an HSS and a combined node which comprises one or more mobility management network elements;

Wherein the combined node is configured to initiate a purge flow of the UE to the HSS when determining that the registration state of the UE in all mobility management network elements of the combined node is unregistered and is not consistent with the registration state stored in the HSS.

The combined node includes two mobility management network elements;

wherein the first mobility management network element is an MME, and the second mobility management network element is an SGSN; or the first mobility management network element is an SGSN, and the second mobility management network element is an MME; and the first mobility management network element and the second mobility management network element have the same address.

The combined node is further configured to check the registration state of the UE in the second mobility management network element when actively deleting the subscription data of the UE in the first mobility management network element. When the registration state of the UE in the second mobility management network element is unregistered, i.e., the subscription data of the UE in the second mobility management network element is not existed or has been deleted, or the purge mark of the UE in the second mobility management network element has been set, the combined node determines that the registration state of the UE in all mobility management network elements of the combined node is unregistered and such state is not consistent with the registration state stored in the HSS, therefore initiates the purge flow of the UE to the HSS.

The combined node is further configured to check the registration state of the UE in the second mobility management network element when actively deleting the subscription data of the UE in the first mobility management network element, and clear the purge mark of the UE in the second mobility management network element when the registration state of the UE in the second mobility management network element is unregistered; and set the purge mark of the UE in the first mobility management network element when the registration state of the UE in the second mobility management network element is registered.

The combined node is further configured to, after receiving a location purge message from the HSS, clear the purge mark of the UE in the first mobility management network element and check the registration state of the UE in the second mobility management network element when the location purge type in the location purge message is the update flow of the first mobility management network element. In the case that the registration state of the UE in the second mobility management network element is unregistered, i.e., the subscription data of the UE in the second mobility management network element is not existed or has been deleted, or the purge mark of the UE in the second mobility management network element has been set, the combined node determines that the registration state of the UE in all mobility management network elements is unregistered and is not consistent with the registration state stored in the HSS, therefore initiates the purge flow of the UE to the HSS. When the location purge type in the location purge message is the update flow of the second mobility management network element, the combined node clears the purge mark of the UE in the second mobility management network element and checks the registration state of the UE in the first mobility management network element. When the registration state of the UE in the first mobility management network element is unregistered, i.e., the subscription data of the UE in the second mobility management network element is not existed or has been deleted, or the purge mark of the UE in the first mobility management network element has been set, the combined node determines that the registration state of the UE in all mobility management network elements is unregistered and such state is not consistent with the registration state stored in the HSS, therefore initiates the purge flow of the UE to the HSS.

The implementing methods of the present disclosure are further described in detail below with reference to specific application instances.

Figure 4:
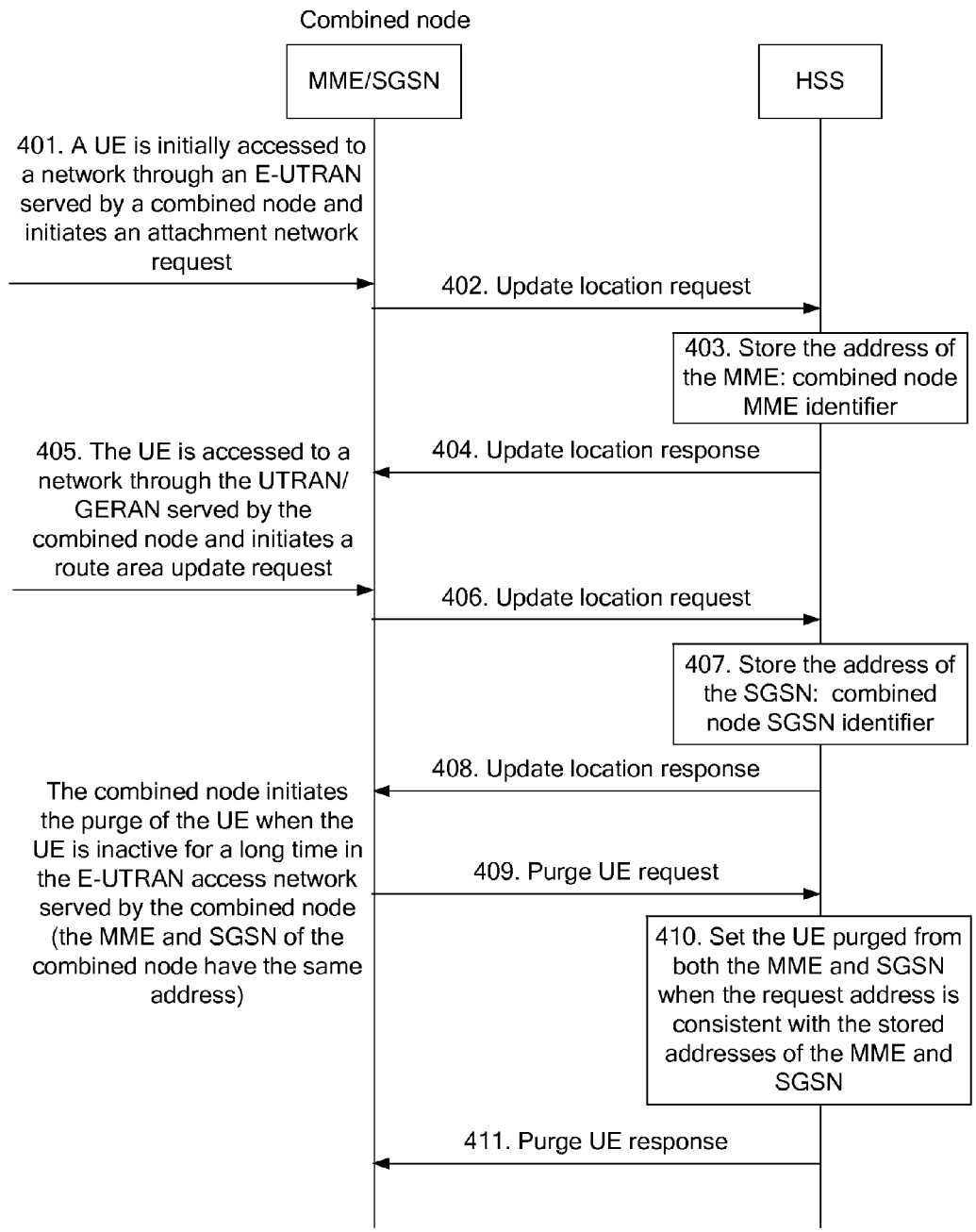
FIG. 4 is a diagram showing a register and purge flow of a UE through different access networks in the application scenario that the registered network nodes MME and SGSN are integratively deployed and have the same address in a combined node in the prior art.

FIG. 5A1 is a diagram showing a purge flow of UE performed by a combined node when the UE is inactive for a long time in the E-UTRAN served by the combined node in the application scenario of FIG. 4 according to an embodiment of the present disclosure, wherein the subscription data in the MME and the subscription data in SGSN are stored separately. The flow includes the following steps:

S501A1~S508A1: like the prior art, a UE is accessed to a network through the E-UTRAN and UTRAN/GERAN respectively and is registered in a same serving combined MME/SGSN node, the HSS stores the addresses of both the MME and SGSN of the combined MME/SGSN node and clears the purge marks of the UE in both the MME and SGSN;

S509A1: when detecting that the UE is inactive for a long time in the E-UTRAN access network served by the combined node, or when deleting the subscription information of the user due to some reasons, the combined node checks the registration state of the UE in the SGSN of the combined node; in the case that the registration state of the UE in the SGSN is unregistered, i.e., the subscription data of the UE in the SGSN is not existed or has been deleted, the combined node initiates the purge flow of the UE to the HSS;

in the case that the registration state of the UE in the SGSN is registered, i.e., the subscription data of the UE in the SGSN is existed, the combined node does not initiate the purge flow of the UE to the HSS;

S510A1~S512A1: like the prior art, the combined node sends a UE purge message to the HSS; the HSS determines whether the address of a source entity carried in the message is matched with one of the stored addresses of the MME and SGSN, and sets the purge mark of the UE in the MME or SGSN according to a matched result.

Figure 2:
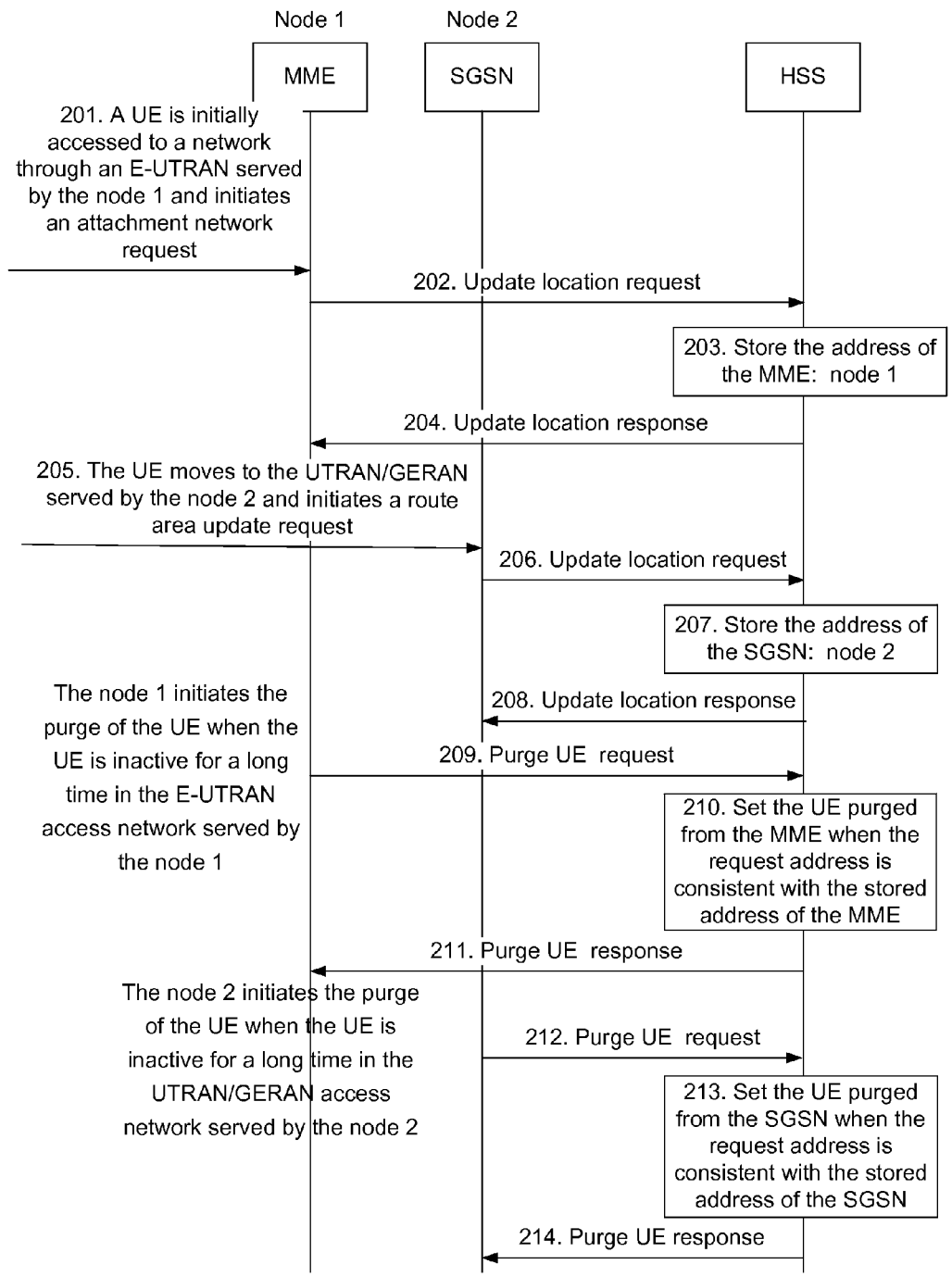
FIG. 2 is a diagram showing a register and purge flow of a UE through different access networks in the application scenario that the registered network nodes MME and SGSN are deployed independently in the prior art.
Figure 3:
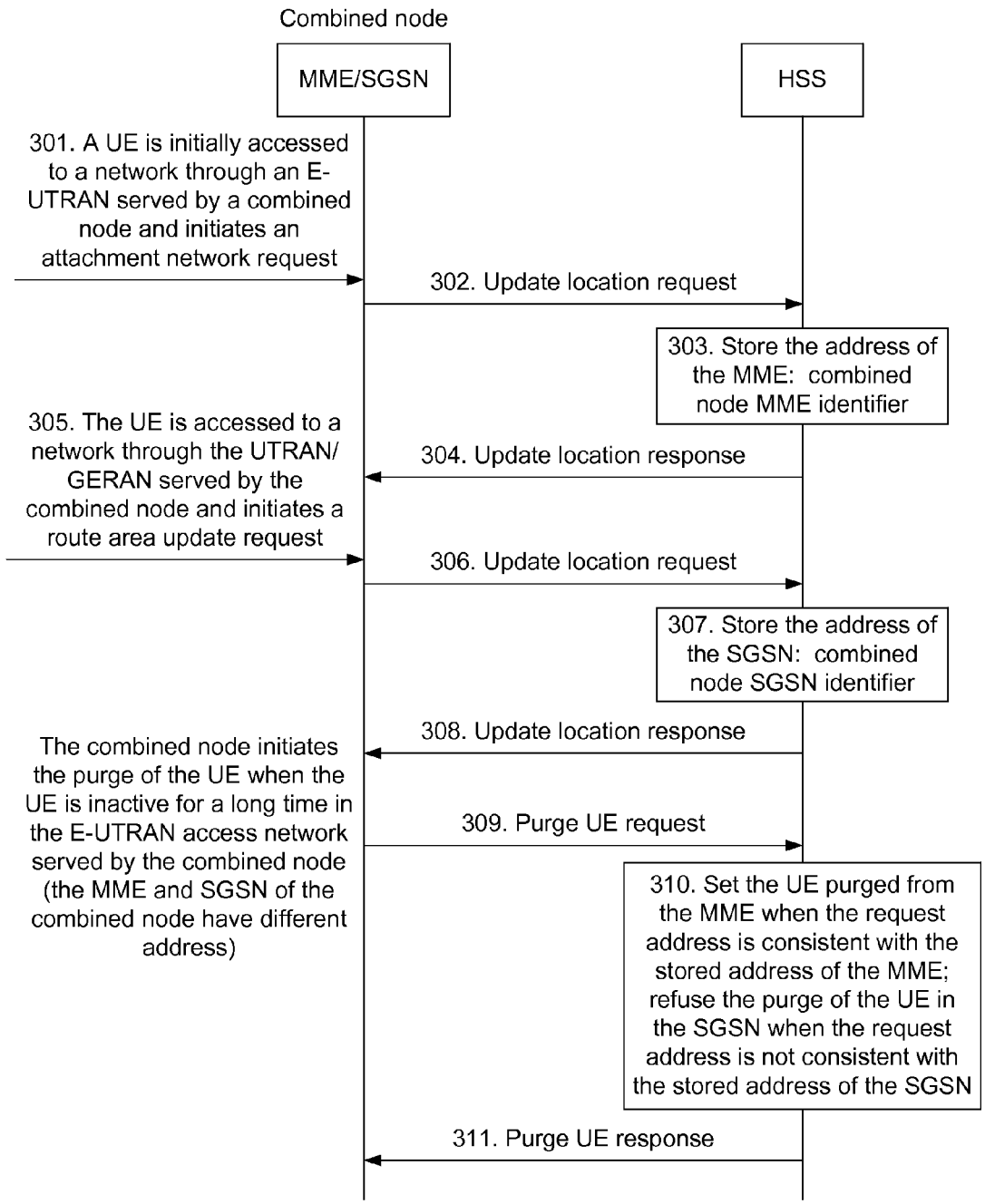
FIG. 3 is a diagram showing a register and purge flow of a UE through different access networks in the application scenario that the registered network nodes MME and SGSN are integratively deployed and have different addresses in a combined node in the prior art.

FIG. 5A2 is another diagram showing a purge flow of UE performed by a combined node when the UE is inactive for a long time in the E-UTRAN served by the combined node in the application scenario of FIG. 4 according to an embodiment of the present disclosure, wherein the subscription data in the MME and the subscription data in SGSN are stored separately or integratively. The flow includes the following steps:

S501A2~S508A2: like the prior art, a UE is accessed to a network through the E-UTRAN and UTRAN/GERAN respectively and is registered in a same serving combined MME/SGSN node, the HSS stores the addresses of both the MME and SGSN of the combined MME/SGSN node and clears the purge marks of the UE in both the MME and SGSN; the combined MME/SGSN node also clears the purge marks of the UE in both the MME and SGSN;

S509A2: when detecting that the UE is inactive for a long time in the E-UTRAN access network served by the combined node, or when planning to delete the subscription information of the user due to some reasons (i.e., setting the purge mark of the UE in the MME rather than actually deleting the subscription information of the user), the combined node checks the registration state of the UE in the SGSN of the combined node; in the case that the registration state of the UE in the SGSN is unregistered, i.e., the purge mark of the UE in the SGSN has been set, the combined node deletes the subscription information of the UE in the MME and the subscription information of the UE in the SGSN, or deletes subscription information of the user which is stored integratively, initiates the purge flow of the UE to the HSS, and clears the purge marks of the UE in both the SGSN and MME;

in the case that the registration state of the UE in the SGSN is registered, i.e., the purge mark of the UE in the SGSN is not set and in a "clear" state, the combined node does not initiate the purge flow of the UE to the HSS;

S510A2~S512A2: like the prior art, the combined node sends a UE purge message to the HSS; the HSS determines whether the address of a source entity carried in the message is matched with one of the stored addresses of the MME and SGSN, and sets the purge mark of the UE in the MME or SGSN according to a matched result.

FIG. 5B1 is a diagram showing a purge flow of UE performed by a combined node when the UE is inactive for a long time in the UTRAN/GERAN served by the combined node in the application scenario of FIG. 4 according to an embodiment of the present disclosure, wherein the subscription data in the MME and the subscription data in SGSN are stored separately. The flow includes the following steps:

S501B2~S508B2: like the prior art, a UE is accessed to a network through the E-UTRAN and UTRAN/GERAN respectively and is registered in a same serving combined MME/SGSN node, the HSS stores the addresses of both the MME and SGSN of the combined MME/SGSN node and clears the purge marks of the UE in both the MME and SGSN;

S509B1: when detecting that the UE is inactive for a long time in the UTRAN/GERAN access network served by the combined node, or when deleting the subscription information of the user due to some reasons, the combined node checks the registration state of the UE in the MME of the combined node; in the case that the registration state of the UE in the MME is unregistered, i.e., the subscription data of the UE in the MME is not existed or has been deleted, the combined node initiates the purge flow of the UE to the HSS;

in the case that the registration state of the UE in the MME is registered, i.e., the subscription data of the UE in the MME is existed, the combined node does not initiate the purge flow of the UE to the HSS;

S510B1~S512B1: like the prior art, the combined node sends a UE purge message to the HSS; the HSS determines whether the address of a source entity carried in the message is matched with one of the stored addresses of the MME and SGSN, and sets the purge mark of the UE in the MME or SGSN according to a matched result.

FIG. 5B2 is another diagram showing a purge flow of UE performed by a combined node when the UE is inactive for a long time in the UTRAN/GERAN served by the combined node in the application scenario of FIG. 4 according to an embodiment of the present disclosure, wherein the subscription data in the MME and the subscription data in SGSN are stored separately or integratively. The flow includes the following steps:

S501B2~S508B2: like the prior art, a UE is accessed to a network through the E-UTRAN and UTRAN/GERAN respectively and is registered in a same serving combined MME/SGSN node, the HSS stores the addresses of both the MME and SGSN of the combined MME/SGSN node and clears the purge marks of the UE in both the MME and SGSN; the combined MME/SGSN node also clears the purge marks of the UE in both the MME and SGSN;

S509B2: when detecting that the UE is inactive for a long time in the UTRAN/GERAN access network served by the combined node, or when planning to delete the subscription information of the user due to some reasons (i.e., setting the purge mark of the UE in the SGSN rather than actually deleting the subscription information of the user), the combined node checks the registration state of the UE in the MME of the combined node; in the case that the registration state of the UE in the MME is unregistered, i.e., the purge mark of the UE in the MME has been set, the combined node deletes the subscription information of the UE in the MME and the subscription information of the UE in the SGSN, or deletes subscription information of the user which is integratively stored, initiates the purge flow of the UE to the HSS, and clears the purge marks of the US in both the SGSN and MME;

in the case that the registration state of the UE in the MME is registered, i.e., the purge mark of the UE in the MME is not set and in a "clear" state, the combined node does not initiate the purge flow of the UE to the HSS;

S510B2~S512B2: like the prior art, the combined node sends a UE purge message to the HSS; the HSS determines whether the address of a source entity carried in the message is matched with one of the stored address of the MME and SGSN, and sets the purge mark of the UE in the MME or SGSN according to the matched result.

FIG. 6A1 is a diagram showing a purge flow of UE performed by a combined node when a purge type in a location purge message received by the combined node is an update flow of the MME in the application scenario of FIG. 4 according to an embodiment of the present disclosure, wherein the subscription data in the MME and the subscription data in the SGSN are stored separately. The flow includes the following steps:

S601A1~S608A1: like the prior art, a UE is accessed to a network through the E-UTRAN and UTRAN/GERAN respectively and is registered in a same serving combined MME/SGSN node, the HSS stores the addresses of both the MME and SGSN of the combined MME/SGSN node and clears the purge marks of the UE in both the MME and SGSN;

S609A1~S610A1: like the prior art, because the MME is changed, the HSS receives a request message for MME update flow, then the HSS sends a location purge request to the registered MME of a source combined node, the purge type is set to an MME update flow;

S611A1: because the MME and SGSN of the combined node have the same address, the combined node checks the registration state of the UE in the SGSN; in the case that the registration state of the UE in the SGSN is unregistered, i.e., the subscription data of the UE in the SGSN is not existed or has been deleted, the combined node initiates the purge flow of the UE to the HSS;

in the case that the registration state of the UE in the SGSN is registered, i.e., the subscription data of the UE in the SGSN is existed, the combined node does not initiate the purge flow of the UE;

S612A1~S614A1: like the prior art, the combined node sends a UE purge message to the HSS; the HSS determines whether the address of a source entity carried in the message is matched with one of the stored addresses of the MME and SGSN, and sets the purge mark of the UE in the MME or SGSN according to a matched result.

FIG. 6A2 is another diagram showing a purge flow of UE performed by a combined node when a purge type in a location purge message received by the combined node is an update flow of the MME in the application scenario of FIG. 4 according to an embodiment of the present disclosure, wherein the subscription data in the MME and the subscription data in the SGSN are stored separately or integratively. The flow includes the following steps:

S601A2~S608A2: like the prior art, a UE is accessed to a network through the E-UTRAN and UTRAN/GERAN respectively and is registered in a same serving combined MME/SGSN node, the HSS stores the addresses of both the MME and SGSN of the combined MME/SGSN node and clears the purge marks of the UE in both the MME and SGSN; the combined MME/SGSN node also clears the purge marks of the UE in both the MME and SGSN;

S609A2~S610A2: like the prior art, because the MME is changed, the HSS receives a request message for MME update flow, then the HSS sends a location purge request to the registered MME of a source combined node, the purge type is set to an MME update flow;

S611A: because the MME and SGSN of the combined node have the same address, the combined node checks the registration state of the UE in the SGSN; in the case that the registration state of the UE in the SGSN is unregistered, i.e., the purge mark of the UE in the SGSN has been set, the combined node initiates the purge flow of the UE to the HSS and clears the purge marks of the UE in both the SGSN and MME;

in the case that the registration state of the UE in the SGSN is registered, i.e., the purge mark of the UE in the SGSN is not set and in a "clear" state, the combined node does not initiate the purge flow of the UE;

S612A2~S614A2: like the prior art, the combined node send a UE purge message to the HSS; the HSS determines whether the address of a source entity carried in the message is matched with one of the stored addresses of the MME and SGSN, and sets the purge mark of the UE in the MME or SGSN according to a matched result.

FIG. 6B1 is diagram showing a purge flow of UE performed by a combined node when a purge type in a location purge message received by the combined node is an update flow of the SGSN in the application scenario of FIG. 4 according to an embodiment of the present disclosure, wherein the subscription data in the MME and the subscription data in the SGSN are stored separately. The flow includes the following steps:

S601B1~S608B1: like the prior art, a UE is accessed to a network through the E-UTRAN and UTRAN/GERAN respectively and is registered in the same serving combined MME/SGSN node, the HSS stores the addresses of both the MME and SGSN of the combined MME/SGSN node and clears the purge marks of the UE in both the MME and SGSN;

S609B1~S610B1: like the prior art, because the SGSN is changed, the HSS receives a request message for SGSN update flow, then the HSS sends a location purge to the registered SGSN of a source combined node; and the purge type is set to an SGSN update flow;

S611B1: because the MME and SGSN of the combined node have the same address, the combined node checks the registration state of the UE in the MME; in the case that the registration state of the UE in the MME is unregistered, i.e., the subscription data of the UE in the MME is not existed or has been deleted, the combined node initiates the purge flow of the UE to the HSS;

in the case that the registration state of the UE in the MME is registered, i.e., the subscription data of the UE in the MME is existed, the combined node does not initiate the purge flow of the UE to the HSS;

S612B1~S614B1: like the prior art, the combined node sends a UE purge message to the HSS; the HSS determines whether the address of a source entity carried in the message is matched with one of the stored addresses of the MME and SGSN, and sets the purge mark of the UE in the MME or SGSN according to a matched result.

FIG. 6B2 is another diagram showing a purge flow of UE performed by a combined node when a purge type in a location purge message received by the combined node is an update flow of the SGSN in the application scenario of FIG. 4 according to an embodiment of the present disclosure, wherein the subscription data in the MME and the subscription data in the SGSN are stored separately or integratively. The flow includes the following steps:

S601B2~S608B2: like the prior art, a UE is accessed to a network through the E-UTRAN and UTRAN/GERAN respectively and is registered in a same serving combined MME/SGSN node, the HSS stores the addresses of both the MME and SGSN of the combined MME/SGSN node and clears the purge marks of the UE in both the MME and SGSN; the combined MME/SGSN node also clears the purge marks of the UE in both the MME and SGSN;

S609B2~S610B2: like the prior art, because the SGSN is changed, the HSS receives a request message for SGSN update flow, then the HSS sends a location purge to the registered SGSN of a source combined node, the purge type is set to an SGSN update flow;

S611B2: because the MME and SGSN of the combined node have the same address, the combined node checks the registration state of the UE in the MME; in the case that the registration state of the UE in the MME is unregistered, i.e., the purge mark of the UE in the MME has been set, the combined node initiates the purge flow of the UE to the HSS and clears the purge marks of the UE in the SGSN and MME; in the case that the registration state of the UE in the MME is registered, i.e., the purge mark of the UE in the MME is not set and in a "clear" state, the combined node does not initiate the purge flow of the UE; and S612B2~S614B2: like the prior art, the combined node sends a UE purge message to the HSS; the HSS determines whether the address of a source entity carried in the message is matched with one of the stored addresses of the MME and SGSN, and sets the purge mark of the UE in the MME or SGSN according to a matched result.

Of course, the present disclosure further has various other embodiments, and various corresponding changes and modifications may be made by those skilled in the art within the essence of the present disclosure, but those changes and modifications should belong to the protection scope of the claims of the present disclosure.

INDUSTRIAL APPLICABILITY

Compared with the prior art, the method and system for accomplishing user terminal purge provided by the present disclosure are simple and convenient to implement and effectively solve the technical problem in the prior art.

The invention claimed is:

1. A method for accomplishing a User Equipment (UE) purge, comprising:
    initiating, by a combined node, a purge flow of the UE to a Home Subscriber Server (HSS) to which the UE is attached when the combined node determines that a registration state of the UE in all mobility management network elements of the combined node is unregistered and the registration state is not consistent with a registration state of the UE stored in the HSS;
    wherein the combined node comprises one or more mobility management network elements.
2. The method according to claim 1, wherein
the registration state of the UE in all mobility management network elements of the combined node being unregistered indicates that subscription data of the UE in each mobility management network element of the combined node is not existed or has been deleted, or each mobility management network element of the combined node has set a purge mark of the UE therein.
3. The method according to claim 2, wherein
the combined node comprises two mobility management network elements;
wherein a first mobility management network element is a Mobility Management Entity (MME), and a second mobility management network element is a Serving GPRS Support Node (SGSN); or
the first mobility management network element is an SGSN, and the second mobility management network element is an MME; and
the first mobility management network element and the second mobility management network element have the same address.
4. The method according to claim 3, wherein
checking, by the combined node, the registration state of the UE in the second mobility management network element when actively deleting subscription data of the UE in the first mobility management network element; in the case that the registration state of the UE in the second mobility management network element is unregistered, determining, by the combined node, that the registration state of the UE in all mobility management network elements is unregistered and is not consistent with the registration state stored in the HSS, and initiating, by the combined node, the purge flow of the UE to the HSS.
5. The method according to claim 4, wherein
in the step of checking the registration state of the UE in the second mobility management network element,
in the case that the registration state of the UE in the second mobility management network element is unregistered, clearing, by the combined node, the purge mark of the UE in the second mobility management network element; and
in the case that the registration state of the UE in the second mobility management network element is registered, setting, by the combined node, the purge mark of the UE in the first mobility management network element.
6. The method according to claim 5, wherein
receiving, by the combined node, a location purge message from the HSS,
when a location purge type in the location purge message is an update flow of the first mobility management network element, clearing, by the combined node, the purge mark of the UE in the first mobility management network element, and checking the registration state of the UE in the second mobility management network element; when the registration state of the UE in the second mobility management network element is unregistered, determining, by the combined node, that the registration state of the UE in all mobility management network elements is unregistered and is not consistent with the registration state stored in the HSS, and initiating the purge flow of the UE to the HSS; and
when the location purge type in the location purge message is an update flow of the second mobility management network element, clearing, by the combined node, the purge mark of the UE in the second mobility management network element, and checking the registration state of the UE in the first mobility management network element; when the registration state of the UE in the first mobility management network element is unregistered, determining, by the combined node, that the registration state of the UE in all mobility management network elements is unregistered and is not consistent with the registration state stored in the HSS, and initiating the purge flow of the UE to the HSS.

7. The method according to claim 4, wherein
receiving, by the combined node, a location purge message from the HSS,
when a location purge type in the location purge message is an update flow of the first mobility management network element, clearing, by the combined node, the purge mark of the UE in the first mobility management network element, and checking the registration state of the UE in the second mobility management network element; when the registration state of the UE in the second mobility management network element is unregistered, determining, by the combined node, that the registration state of the UE in all mobility management network elements is unregistered and is not consistent with the registration state stored in the HSS, and initiating the purge flow of the UE to the HSS; and
when the location purge type in the location purge message is an update flow of the second mobility management network element, clearing, by the combined node, the purge mark of the UE in the second mobility management network element, and checking the registration state of the UE in the first mobility management network element; when the registration state of the UE in the first mobility management network element is unregistered, determining, by the combined node, that the registration state of the UE in all mobility management network elements is unregistered and is not consistent with the registration state stored in the HSS, and initiating the purge flow of the UE to the HSS.

8. The method according to claim 3, wherein
receiving, by the combined node, a location purge message from the HSS,
when a location purge type in the location purge message is an update flow of the first mobility management network element, clearing, by the combined node, the purge mark of the UE in the first mobility management network element, and checking the registration state of the UE in the second mobility management network element; when the registration state of the UE in the second mobility management network element is unregistered, determining, by the combined node, that the registration state of the UE in all mobility management network elements is unregistered and is not consistent with the registration state stored in the HSS, and initiating the purge flow of the UE to the HSS; and
when the location purge type in the location purge message is an update flow of the second mobility management network element, clearing, by the combined node, the purge mark of the UE in the second mobility management network element, and checking the registration state of the UE in the first mobility management network element; when the registration state of the UE in the first mobility management network element is unregistered, determining, by the combined node, that the registration state of the UE in all mobility management network elements is unregistered and is not consistent with the registration state stored in the HSS, and initiating the purge flow of the UE to the HSS.

9. The method according to claim 1, wherein
the registration state of the UE stored in the HSS indicates that the HSS has set the purge mark of the UE in the mobility management network element, or indicates that the HSS clears the purge mark of the UE in the mobility management network element and stores addresses of all the mobility management network elements of the combined node where the UE is registered.

10. The method according to claim 9, wherein
the combined node comprises two mobility management network elements;
wherein a first mobility management network element is a Mobility Management Entity (MME), and a second mobility management network element is a Serving GPRS Support Node (SGSN); or
the first mobility management network element is an SGSN, and the second mobility management network element is an MME; and
the first mobility management network element and the second mobility management network element have the same address.

11. The method according to claim 10, wherein
checking, by the combined node, the registration state of the UE in the second mobility management network element when actively deleting subscription data of the UE in the first mobility management network element; in the case that the registration state of the UE in the second mobility management network element is unregistered, determining, by the combined node, that the registration state of the UE in all mobility management network elements is unregistered and is not consistent with the registration state stored in the HSS, and initiating, by the combined node, the purge flow of the UE to the HSS.

12. The method according to claim 11, wherein
in the step of checking the registration state of the UE in the second mobility management network element,
in the case that the registration state of the UE in the second mobility management network element is unregistered, clearing, by the combined node, the purge mark of the UE in the second mobility management network element; and
in the case that the registration state of the UE in the second mobility management network element is registered, setting, by the combined node, the purge mark of the UE in the first mobility management network element.

13. The method according to claim 12, wherein
receiving, by the combined node, a location purge message from the HSS,
when a location purge type in the location purge message is an update flow of the first mobility management network element, clearing, by the combined node, the purge mark of the UE in the first mobility management network element, and checking the registration state of the UE in the second mobility management network element; when the registration state of the UE in the second mobility management network element is unregistered, determining, by the combined node, that the registration state of the UE in all mobility management network elements is unregistered and is not consistent with the registration state stored in the HSS, and initiating the purge flow of the UE to the HSS; and
when the location purge type in the location purge message is an update flow of the second mobility management network element, clearing, by the combined node, the purge mark of the UE in the second mobility management network element, and checking the registration state of the UE in the first mobility management network element; when the registration state of the UE in the first mobility management network element is unregistered, determining, by the combined node, that the registration state of the UE in all mobility management network elements is unregistered and is not consistent with the registration state stored in the HSS, and initiating the purge flow of the UE to the HSS.

14. The method according to claim 11, wherein
receiving, by the combined node, a location purge message from the HSS,
when a location purge type in the location purge message is an update flow of the first mobility management network element, clearing, by the combined node, the purge mark of the UE in the first mobility management network element, and checking the registration state of the UE in the second mobility management network element; when the registration state of the UE in the second mobility management network element is unregistered, determining, by the combined node, that the registration state of the UE in all mobility management network elements is unregistered and is not consistent with the registration state stored in the HSS, and initiating the purge flow of the UE to the HSS; and
when the location purge type in the location purge message is an update flow of the second mobility management network element, clearing, by the combined node, the purge mark of the UE in the second mobility management network element, and checking the registration state of the UE in the first mobility management network element; when the registration state of the UE in the first mobility management network element is unregistered, determining, by the combined node, that the registration state of the UE in all mobility management network elements is unregistered and is not consistent with the registration state stored in the HSS, and initiating the purge flow of the UE to the HSS.

15. The method according to claim 10, wherein
receiving, by the combined node, a location purge message from the HSS,
when a location purge type in the location purge message is an update flow of the first mobility management network element, clearing, by the combined node, the purge mark of the UE in the first mobility management network element, and checking the registration state of the UE in the second mobility management network element; when the registration state of the UE in the second mobility management network element is unregistered, determining, by the combined node, that the registration state of the UE in all mobility management network elements is unregistered and is not consistent with the registration state stored in the HSS, and initiating the purge flow of the UE to the HSS; and
when the location purge type in the location purge message is an update flow of the second mobility management network element, clearing, by the combined node, the purge mark of the UE in the second mobility management network element, and checking the registration state of the UE in the first mobility management network element; when the registration state of the UE in the first mobility management network element is unregistered, determining, by the combined node, that the registration state of the UE in all mobility management network elements is unregistered and is not consistent with the registration state stored in the HSS, and initiating the purge flow of the UE to the HSS.

16. A system for accomplishing a user equipment (UE) purge, comprising a Home Subscriber Server (HSS) and a combined node which comprises one or more mobility management network elements, wherein
the combined node is configured to initiate a purge flow of the UE to the HSS when determining that a registration state of the UE in all mobility management network elements is unregistered and the registration state is not consistent with a registration state stored in the HSS.

17. The system according to claim 16, wherein
the registration state of the UE in all mobility management network elements of the combined node being unregistered indicates that subscription data of the UE in each mobility management network element of the combined node is not existed or has been deleted, or each mobility management network element of the combined node has set a purge mark of the UE therein.

18. The system according to claim 17, wherein
the combined node comprises two mobility management network elements;
wherein a first mobility management network element is a Mobility Management Entity (MME), and a second mobility management network element is a Serving GPRS Support Node (SGSN); or the first mobility management network element is an SGSN, and the second mobility management network element is an MME; and
the first mobility management network element and the second mobility management network element have the same address.

19. The system according to claim 18, wherein
the combined node is further configured to check the registration state of the UE in the second mobility management network element when actively deleting subscription data of the UE in the first mobility management network element; in the case that the registration state of the UE in the second mobility management network element is unregistered, determine that the registration state of the UE in all mobility management network elements is unregistered and is not consistent with the registration state stored in the HSS, and initiate the purge flow of the UE to the HSS.

20. The system according to claim 19, wherein
the combined node is further configured to clear the purge mark of the UE in the second mobility management network element when determining that the registration state of the UE in the second mobility management network element is unregistered; or set the purge mark of the UE in the first mobility management network element when determining that the registration state of the UE in the second mobility management network element is registered.

21. The system according to claim 20, wherein
the combined node is further configured to, after receiving a location purge message from the HSS, clear the purge mark of the UE in the first mobility management network element and check the registration state of the UE in the second mobility management network element when a location purge type in the location purge message is an update flow of the first mobility management network element; when the registration state of the UE in the second mobility management network element is unregistered, determine that the registration state of the UE in all mobility management network elements is unregistered and is not consistent with the registration state stored in the HSS, and initiate the purge flow of the UE to the HSS; and
clear the purge mark of the UE in the second mobility management network element and check the registration state of the UE in the first mobility management network element when the location purge type in the location purge message is an update flow of the second mobility management network element; when the registration state of the UE in the first mobility management network element is unregistered, determine that the registration state of the UE in all mobility management network elements is unregistered and is not consistent with the registration state stored in the HSS, and initiate the purge flow of the UE to the HSS.

22. The system according to claim 19, wherein
the combined node is further configured to, after receiving a location purge message from the HSS, clear the purge mark of the UE in the first mobility management network element and check the registration state of the UE in the second mobility management network element when a location purge type in the location purge message is an update flow of the first mobility management network element; when the registration state of the UE in the second mobility management network element is unregistered, determine that the registration state of the UE in all mobility management network elements is unregistered and is not consistent with the registration state stored in the HSS, and initiate the purge flow of the UE to the HSS; and
clear the purge mark of the UE in the second mobility management network element and check the registration state of the UE in the first mobility management network element when the location purge type in the location purge message is an update flow of the second mobility management network element; when the registration state of the UE in the first mobility management network element is unregistered, determine that the registration state of the UE in all mobility management network elements is unregistered and is not consistent with the registration state stored in the HSS, and initiate the purge flow of the UE to the HSS.

23. The system according to claim 18, wherein
the combined node is further configured to, after receiving a location purge message from the HSS, clear the purge mark of the UE in the first mobility management network element and check the registration state of the UE in the second mobility management network element when a location purge type in the location purge message is an update flow of the first mobility management network element; when the registration state of the UE in the second mobility management network element is unregistered, determine that the registration state of the UE in all mobility management network elements is unregistered and is not consistent with the registration state stored in the HSS, and initiate the purge flow of the UE to the HSS; and
clear the purge mark of the UE in the second mobility management network element and check the registration state of the UE in the first mobility management network element when the location purge type in the location purge message is an update flow of the second mobility management network element; when the registration state of the UE in the first mobility management network element is unregistered, determine that the registration state of the UE in all mobility management network elements is unregistered and is not consistent with the registration state stored in the HSS, and initiate the purge flow of the UE to the HSS.

24. The system according to claim 16, wherein
the registration state of the UE stored in the HSS indicates that the HSS has set the purge mark of the UE in the mobility management network element, or indicates that the HSS clears the purge mark of the UE in the mobility management network element and stores addresses of all the mobility management network elements of the combined node where the UE is registered.

25. The system according to claim 24, wherein
the combined node comprises two mobility management network elements;
wherein a first mobility management network element is a Mobility Management Entity (MME), and a second mobility management network element is a Serving GPRS Support Node (SGSN); or the first mobility management network element is an SGSN, and the second mobility management network element is an MME; and
the first mobility management network element and the second mobility management network element have the same address.

26. The system according to claim 25, wherein
the combined node is further configured to check the registration state of the UE in the second mobility management network element when actively deleting subscription data of the UE in the first mobility management network element; in the case that the registration state of the UE in the second mobility management network element is unregistered, determine that the registration state of the UE in all mobility management network elements is unregistered and is not consistent with the registration state stored in the HSS, and initiate the purge flow of the UE to the HSS.

27. The system according to claim 26, wherein
the combined node is further configured to clear the purge mark of the UE in the second mobility management network element when determining that the registration state of the UE in the second mobility management network element is unregistered; or set the purge mark of the UE in the first mobility management network element when determining that the registration state of the UE in the second mobility management network element is registered.

28. The system according to claim 27, wherein
the combined node is further configured to, after receiving a location purge message from the HSS, clear the purge mark of the UE in the first mobility management network element and check the registration state of the UE in the second mobility management network element when a location purge type in the location purge message is an update flow of the first mobility management network element; when the registration state of the UE in the second mobility management network element is unregistered, determine that the registration state of the UE in all mobility management network elements is unregistered and is not consistent with the registration state stored in the HSS, and initiate the purge flow of the UE to the HSS; and
clear the purge mark of the UE in the second mobility management network element and check the registration state of the UE in the first mobility management network element when the location purge type in the location purge message is an update flow of the second mobility management network element; when the registration state of the UE in the first mobility management network element is unregistered, determine that the registration state of the UE in all mobility management network elements is unregistered and is not consistent with the registration state stored in the HSS, and initiate the purge flow of the UE to the HSS.

29. The system according to claim 26, wherein
the combined node is further configured to, after receiving a location purge message from the HSS, clear the purge mark of the UE in the first mobility management network element and check the registration state of the UE in the second mobility management network element when a location purge type in the location purge message is an update flow of the first mobility management network element; when the registration state of the UE in the second mobility management network element is unregistered, determine that the registration state of the UE in all mobility management network elements is unregistered and is not consistent with the registration state stored in the HSS, and initiate the purge flow of the UE to the HSS; and clear the purge mark of the UE in the second mobility management network element and check the registration state of the UE in the first mobility management network element when the location purge type in the location purge message is an update flow of the second mobility management network element; when the registration state of the UE in the first mobility management network element is unregistered, determine that the registration state of the UE in all mobility management network elements is unregistered and is not consistent with the registration state stored in the HSS, and initiate the purge flow of the UE to the HSS.

30. The system according to claim 25, wherein the combined node is further configured to, after receiving a location purge message from the HSS, clear the purge mark of the UE in the first mobility management network element and check the registration state of the UE in the second mobility management network element when a location purge type in the location purge message is an update flow of the first mobility management network element; when the registration state of the UE in the second mobility management network element is unregistered, determine that the registration state of the UE in all mobility management network elements is unregistered and is not consistent with the registration state stored in the HSS, and initiate the purge flow of the UE to the HSS; and clear the purge mark of the UE in the second mobility management network element and check the registration state of the UE in the first mobility management network element when the location purge type in the location purge message is an update flow of the second mobility management network element; when the registration state of the UE in the first mobility management network element is unregistered, determine that the registration state of the UE in all mobility management network elements is unregistered and is not consistent with the registration state stored in the HSS, and initiate the purge flow of the UE to the HSS.

\* \* \* \* \*